United States Patent [19]
Nelson

[11] Patent Number: 5,167,099
[45] Date of Patent: Dec. 1, 1992

[54] BIRD-DETERRING DEVICE

[76] Inventor: George Nelson, 149 Dahlgren Pl., Brooklyn, N.Y. 11228

[21] Appl. No.: 705,563

[22] Filed: May 24, 1991

[51] Int. Cl.⁵ .............................................. E04B 1/72
[52] U.S. Cl. ........................................................ 52/101
[58] Field of Search ................. 52/25, 101; 256/11, 256/12

[56]  References Cited
U.S. PATENT DOCUMENTS

| 2,475,047 | 7/1949 | Peles | 52/101 |
| 2,777,171 | 1/1957 | Burnside et al. | 52/101 |
| 2,888,716 | 1/1959 | Kaufmann | 52/101 |
| 3,191,239 | 1/1965 | Moore et al. | 52/101 |
| 3,407,550 | 10/1968 | Shaw | 52/101 |

Primary Examiner—Richard E. Chilcot, Jr.
Attorney, Agent, or Firm—Charles E. Baxley

[57] ABSTRACT

A bird-deterring device comprising a plurality of comb-like members each having comb teeth, brackets for holding said comb-like members spaced above an upwardly facing horizontal surface with the comb-like members oriented with their teeth facing away from each other, and a line having knots near its ends and passable between adjacent teeth of the comb-like members and back and forth from one comb-like member to the other, with the knots holding the line in place.

4 Claims, 1 Drawing Sheet

BIRD-DETERRING DEVICE

BACKGROUND OF THE INVENTION

This invention relates to a bird-deterring device and more particularly to such a device for preventing birds from nesting or roosting on an upwardly facing horizontal surface, such as a window sill, a window ledge, a roof or other projection of a building.

The prior art suggests a number of techniques for performing this general function. A patentability search on the disclosure hereof has revealed the following U.S. patents:

| U.S. Pat. No. | Issue Date | Inventor |
| --- | --- | --- |
| 2,142,371 | January 3, 1939 | Peles |
| 2,485,148 | October 18, 1949 | Fralin |
| 3,148,417 | September 15, 1964 | Bellas |
| 3,416,266 | December 17, 1968 | Eron |
| 3,436,882 | April 8, 1969 | Keefe |
| 4,937,988 | July 3, 1990 | Gratton |

The patents to Fralin and Bellas seem to be representative of the cited patents.

Fralin presents an antiroosting device comprising a rectangular rotatable wire frame formed of a strand of wire. The frame has a first straight side, and angled end portions and the wire ends are twisted together to form a second straight side parallel to the first side, with aligned journal loops at the angled portions. Journal brackets are provided for mounting on a building and carry aligned rods extending through the journal loops. The theory is that a bird intending to roost on the device will attempt to perch on one of the straight sides and the weight of the bird will cause the frame to rotate, distracting the bird and causing it to leave.

Bellas discloses a bird-proofing device applicable to ledges, sills and the like of buildings to protect same against birds. The Bellas device includes a plurality of taut, substantially parallel strands supported by suitable brackets and retained in a three-dimensional spacing pattern, to prevent birds such as pigeons, crows, sea gulls or the like from alighting on a ledge, sill or the like on which the device is mounted.

The prior art devices, including particularly Fralin and Bellas, are somewhat cumbersome to set up and may be quite inefficient in terms of providing coverage of a desired area, such as a projection which may be quite large.

Accordingly, it is an important object of the present invention to provide an improved bird-deterring device for preventing birds from nesting or roosting in undesirable places.

It is another object of the invention to provide such a bird-deterring device which is of simple construction and easy to set up.

It is a further object of the invention to provide such a bird-deterring device of increased efficiency in terms of providing effective coverage of a desired generally horizontal area of a building.

It is yet another object of the invention to provide such a bird-deterring device which will not harm birds in any way.

The manner in which a bird-deterring device according to the invention functions in attaining the foregoing objects and advantages will become apparent hereinafter.

SUMMARY OF THE INVENTION

A bird-deterring device according to the invention makes use of a plurality of comb-like members, and adjustable brackets to be mounted on an upwardly facing horizontal surface of a building. The brackets hold the comb-like members in horizontal orientation an adjustable distance above the horizontal surface, with the comb teeth facing generally away from each other. A line, which advantageously is a nylon fishing line of 80 pounds pull strength, is appropriately provided with knots and is passed between teeth of the comb-like members and back and forth between the comb-like members to cover substantially the entirety of the horizontal surface. The knots in the line hold the line in place.

After the device is set up, the nylon line harmlessly prevents birds from spreading their wings comfortably and also stops their mating habits. The device will also prevent birds from nesting and will cause them to leave the area without harm to themselves.

DESCRIPTION OF THE INVENTION

Figure 1:
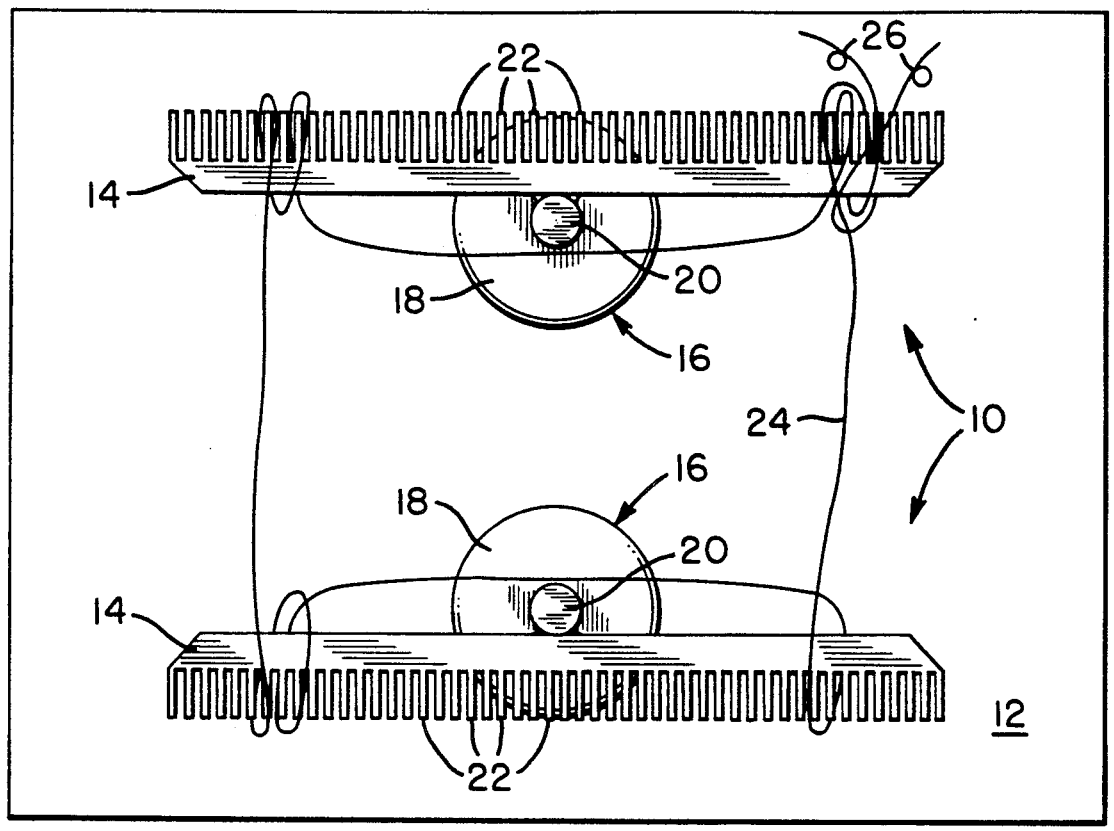
FIG. 1 is a partly schematic plan view of a device according to the invention showing the same set up on a horizontal surface.
Figure 2:
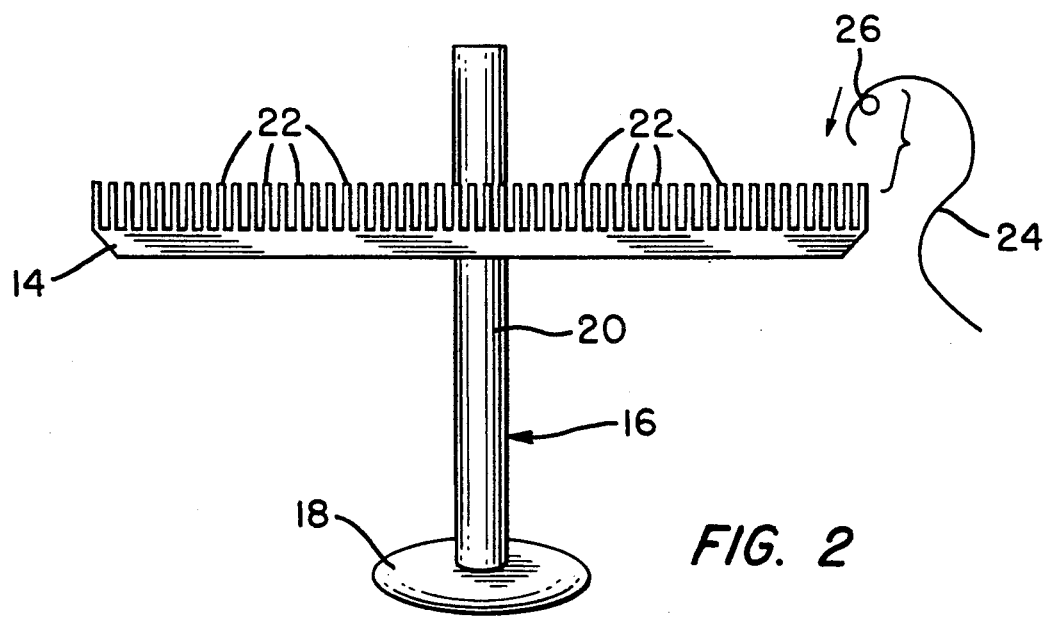
FIG. 2 is a partly schematic view showing a knot on a line about to be engaged with a tooth of a comb-like member.

A bird-deterring device 10 embodying the invention is shown in FIG. 1 set up on an upwardly facing horizontal surface 12.

Device 10 includes a plurality of comb-like members 14 (two, as shown), each held by a bracket 16 which is of adjustable height, depending on the size of the birds that are to be deterred. Each bracket 16 has a base 18 and a vertical post 20 which supports one of comb-like members 14.

Brackets 16 hold comb-like members 14 in horizontal orientation an adjustable distance above surface 12. Comb-like members 14 have comb teeth 22 and comb-like members 14 are oriented so that teeth 22 face generally away from each other.

Device 10 also includes a line 24, which advantageously is a nylon fishing line of 80 pounds pull strength. Line 24 is appropriately provided with knots 26 near its ends. Line 24 is passed between adjacent teeth 22 of comb-like members 14 and back and forth from one comb-like member 14 to the other comb-like member 14 to cover substantially the entirety of horizontal surface 12. Knots 26 in line 24 hold line 24 in place.

It is apparent that the invention well attains the stated objects and advantages and others.

Disclosed details are exemplary only and are not to be taken as limitations on the invention except as the details are included in the appended claims.

What is claimed is:

1. A bird-deterring device comprising a plurality of comb-like members each having comb teeth, means for holding said comb-like members spaced above an upwardly facing horizontal surface with said comb-like members oriented with said teeth facing away from each other, and a line having knots near its ends and passable between adjacent teeth of said comb-like members and back and forth from one said comb-like member to the other, with said knots holding said line in place.

2. A device according to claim 1 wherein said means for holding said comb-like members is provided by adjustable brackets.

3. A device according to claim 1 wherein said line is passable back and forth between said comb-like members to cover substantially the entirety of the horizontal surface.

4. A device according to claim 1 wherein said line is nylon fishing line of 80 pounds pull strength.

* * * * *